United States Patent [19]
LeClear et al.

[11] Patent Number: 5,375,428
[45] Date of Patent: Dec. 27, 1994

[54] CONTROL ALGORITHM FOR DUAL TEMPERATURE EVAPORATOR SYSTEM

[75] Inventors: Douglas D. LeClear, St. Joseph Township, Berrien County, Mich.; Kenneth P. Chen, Tustin, Calif.; Scott A. Thiele, St. Joseph, Mich.; Nihat O. Cur, Royalton Township, Berrien County, Mich.; Jatin C. Khanpara, St. Joseph Township, Berrien County, Mich.; Steven J. Kuehl, Lincoln Township, Berrien County, Mich.

[73] Assignee: Whirlpool Corporation, Benton Harbor, Mich.

[21] Appl. No.: 192,214

[22] Filed: Feb. 4, 1994

Related U.S. Application Data

[63] Continuation-in-part of Ser. No. 101,129, Aug. 2, 1993, which is a continuation-in-part of Ser. No. 930,104, Aug. 14, 1992, Pat. No. 5,231,847.

[51] Int. Cl.$^5$ ............................................. F25D 17/08
[52] U.S. Cl. ......................................... 62/187; 62/231; 62/282
[58] Field of Search ............... 62/187, 180, 186, 82, 62/89, 157, 231, 282, 408, 419, 229

[56] References Cited

U.S. PATENT DOCUMENTS

3,248,893 5/1966 McLean ........................ 62/186 X
3,248,894 5/1966 Harbour ........................ 62/180 X
4,122,687 10/1978 McKee ......................... 62/187 X
4,439,998 4/1984 Horvay et al. ................. 62/231 X

*Primary Examiner*—Harry B. Tanner
*Attorney, Agent, or Firm*—Stephen D. Krefman; Thomas J. Roth; Robert O. Rice

[57] ABSTRACT

A refrigeration appliance is provided having at least two refrigeration compartments, each compartment having its own access door. The appliance includes a single evaporator located in a plenum which is selectively in communication with each of the compartments, a single compressor, preferably run by a variable speed motor, and a refrigerant circuit including a series of conduits for providing a flow of refrigerant to the evaporator and compressor. A control determines which of the compartments is demanding cooling and operates the refrigeration device until the detected demand for cooling has been satisfied for the particular compartment. Prior to terminating the operation of the refrigeration device, the control determines if the second compartment is demanding cooling or was within a predetermined temperature range prior to demanding cooling. If either condition exists, the refrigeration device is switched to the second compartment until the demand for cooling therein has been satisfied. The compartments of the refrigerator appliance can be run either in freezer or in fresh food cooling mode as desired, providing convertible refrigerating compartments.

30 Claims, 8 Drawing Sheets

WITH FOLLOWING CHANGES
TO FLOW CHART

WITH FOLLOWING CHANGES
TO FLOW CHART

CONTROL ALGORITHM FOR DUAL TEMPERATURE EVAPORATOR SYSTEM

This is a continuation-in-part of application Ser. No. 08/101,129, filed Aug. 2, 1993 which is a continuation-in-part of Ser. No. 07/930,104 filed Aug. 14, 1992 (U.S. Pat. No. 5,231,847).

BACKGROUND OF THE INVENTION

The present invention generally relates to refrigeration appliances and more particularly to a method for operating refrigeration appliances having a single evaporator for cooling multiple refrigeration compartments more efficiently.

In typical domestic refrigeration appliances, the appliance oftentimes has two separate compartments which are maintained at different temperatures. For example, there may be a freezer compartment which has a temperature maintained below 0° C. and a fresh food compartment which is maintained at a temperature somewhat above 0° C.

In many commercially available refrigeration devices, a single evaporator is used with an evaporating pressure of approximately 0–2 psig. Air is circulated over the evaporator simultaneously from both the freezer compartment and the refrigerator compartment. This "mixed" air flow scheme results in dehumidification of the refrigerator compartment and subsequent frost build-up on the single evaporator coil, thus necessitating a periodic defrost cycle to get rid of the accumulated frost.

Also, using a single evaporator operating at a single evaporating pressure to provide the cooling for two compartments which are maintained at different temperatures results in an inefficient use of the refrigeration system for the higher temperature compartment.

U.S. Pat. No. 4,015,182 discloses the use of a variable capacity DC ECM compressor and a single evaporator in an automobile air conditioner.

U.S. Pat. No. 4,916,916 discloses the use of a phase change energy storage material in connection with a multiple evaporator refrigeration system.

SUMMARY OF THE INVENTION

The present invention provides a system for operating a refrigeration appliance having at least two separate compartments to be cooled and having a refrigeration device with a compressor, a condenser and a single evaporator in a plenum which is in communication with each of the compartments.

In the preferred embodiment disclosed, two airflow circuits over the single evaporator cool a freezer compartment and a fresh food compartment, respectively. During the cooling of the freezer compartment, the evaporator runs at approximately 0–2 psig evaporation pressure due to flow through high resistance capillaries, or other known expansion devices. During the cooling of the fresh food compartment, the evaporator runs approximately at 18–21 psig evaporation pressure due to flow through lower resistance capillaries, at which pressure level, significant energy reductions are achieved.

A method for operating the refrigeration appliance comprises detecting whether either of the compartments is demanding cooling. A control is supplied for carrying out the method steps and for determining which air flow circuit over the single evaporator is to be operated at any given time. The higher temperature refrigerator compartment is given preference, that is, if the fresh food compartment demands cooling first, or if both the fresh food and the freezer compartments demand cooling simultaneously, then the air circuit serving the fresh food compartment is first operated along with selection of the lower resistance capillary until either the temperature sensor lower set limit in the fresh food compartment is satisfied or until a certain maximum length of time corresponding to a typical run cycle under normal operating conditions for the fresh food compartment has occurred. The cooling demand of a given compartment can be checked by detecting whether the temperature sensor of that compartment is above the upper set limit. Upon detection of a cooling demand by a first compartment, that refrigeration device with the proper air flow circuit and capillary is operated until the detected demand for cooling has been satisfied, subsequently determining if a second compartment is either demanding cooling or is within close proximity of a temperature range prior to demanding cooling. Upon determination of either condition, the refrigeration device along with the proper air flow circuit and the capillary for the second compartment is operated until cooling of the second compartment has been satisfied.

If the typical run time for the first compartment has run out before the first compartment temperature sensor lower set limit has been satisfied and the second compartment is requiring cooling, then the first compartment air flow circuit is closed and the second compartment air flow circuit is turned on along with the right capillary selection. The second compartment cooling then continues either until it is satisfied or until it has run for a predetermined amount of time corresponding to a typical cycle run time for that compartment under normal operating conditions. Upon achieving either of these conditions, the second compartment air flow circuit is closed off and the first compartment air flow circuit is turned on and the cycle repeats until both compartments are satisfied.

Once both the first and the second compartment cooling demands are satisfied, the compressor is turned off and the refrigeration device waits for further demand signals. At no time are both the first and the second compartment air flow circuits run simultaneously. An enhancement of this cycle is that before the compressor is turned off at the end of either the first compartment cooling cycle or the second compartment cooling cycle, not only is it first checked to determine whether the other compartment temperature sensor is above its upper set limit, demanding cooling, it is also checked to determine whether the temperature in the other compartment is sufficiently close to the temperature at which cooling will be demanded, meaning that a relatively short "off" period would ensue before cooling is demanded. If a short time period or small temperature differential is detected, then the other air flow circuit and the cooling of that compartment are activated, prematurely, in order to enhance overall system efficiency since inefficiencies occur at the initial start up of the compressor.

A refrigeration appliance is also provided having at least a first compartment and a second compartment to be cooled and a refrigeration device with an evaporator, a compressor and a condenser. Means such as temperature sensors are provided for detecting whether either of the compartments is demanding cooling. Further, means are provided for operating the refrigeration device at least until cooling has been satisfied for the first compartment upon detection of a cooling command. Means for detecting whether the second compartment is demanding cooling or within a temperature range prior to which cooling is demanded is provided. If a cooling demand is detected from the second compartment following cooling of the first compartment, means for switching to cooling of the second compartment is provided.

The present invention also describes convertible refrigerator compartments wherein either compartment or both compartments can be used as the freezer compartment or the fresh food compartment.

Other efficiency enhancements are provided, such as initiating a defrost cycle only at the point in time after a preset time period at which the colder compartment demands cooling. Thus, the defrost cycle will begin when the compartment, and thus the evaporator, are at the warmest allowed temperature, thus reducing the amount of energy which must be input to the evaporator to effect the defrosting. Thus, the refrigeration appliance of the invention provides a method for defrosting the refrigeration devices while neither of the compartments are demanding cooling and after a predetermined time period has elapsed since the previous defrosting cycle. Another enhancement is to run the refrigerant through both capillaries to feed the evaporator when the compartment temperatures are above a quick pulldown threshold limit to facilitate higher refrigerant flow rates, thus quicker initial pulldown for the compartments. Also, the provision of latching valves minimize the electrical energy input and assist in preventing refrigerant migration to the evaporator during an "off" portion of the cycle.

DETAILED DESCRIPTION OF THE PREFERRED EMBODIMENTS

Figure 1:
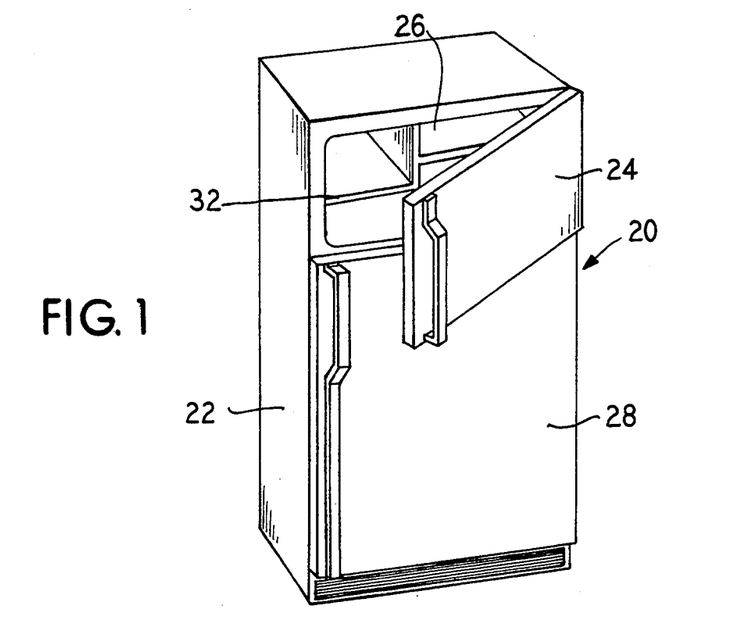
FIG. 1 is a perspective view of a refrigeration appliance in which the control algorithm embodying the principles of the present invention may be used.
Figure 2:
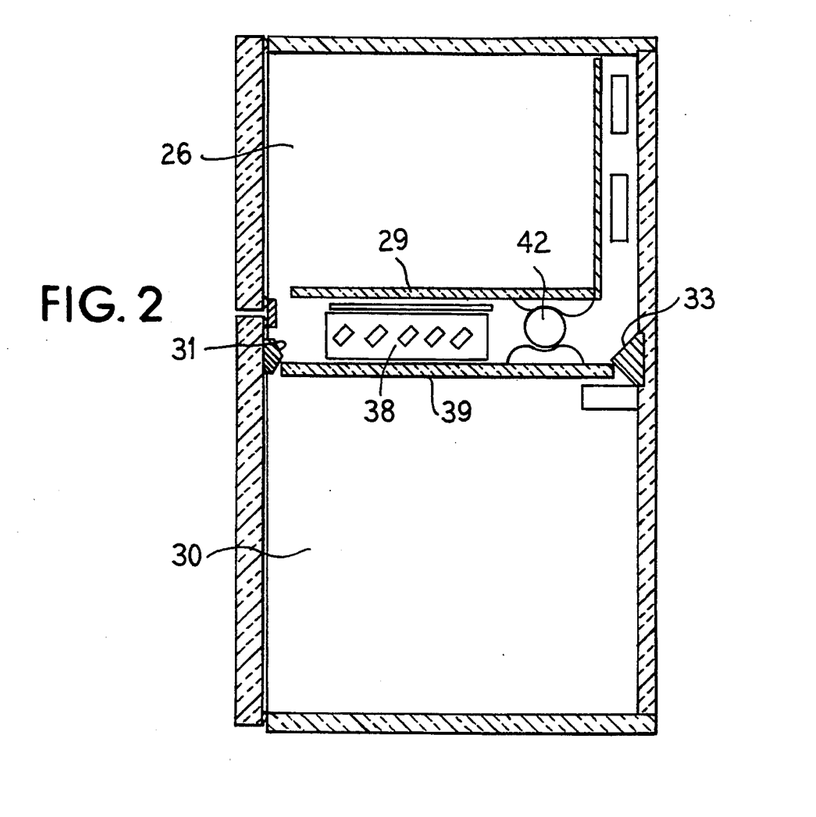
FIG. 2 is a side elevational view of the appliance of FIG. 1.
Figure 2A:
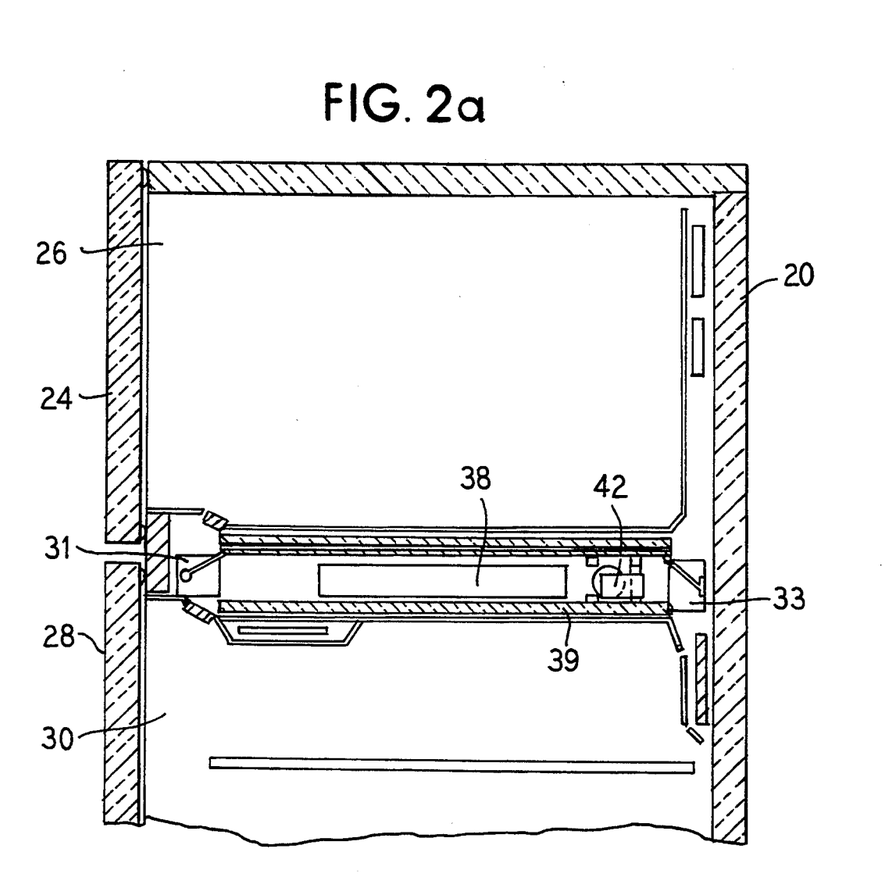
FIG. 2a is an enlarged partial side sectional view of the appliance of FIG. 2.

In FIGS. 1, 2 and 2a, there is shown generally a refrigeration appliance at 20 which comprises an exterior cabinet 22 having a first openable door 24 to expose a first interior compartment 26 and a second openable door 28 to expose a second interior compartment 30. Within each of the compartments 26, 30, there may be one or more shelves 32 for receiving food articles.

Generally, one of the compartments 26, 30, referred to as freezer compartment, will be maintained at a temperature sufficiently below 0° C. to assure that all of the articles contained within that compartment will be maintained in a frozen state. The other compartment, referred to as a fresh food compartment, generally is maintained somewhat above 0° C. to maintain the items placed therein in a chilled, but not frozen condition. In some situations, both of the compartments 26, 30 may be maintained above 0° C. so both act as fresh food compartments. Alternatively, both of the compartments 26, 30 may be maintained below 0° C. so both act as freezer compartments.

In order to maintain the compartments 26, 30 at the desired temperature levels, a refrigeration device is provided which comprises a compressor 34, a condenser 36, and an evaporator 38 in selective communication with one of the compartments 26, 30. The condenser 36 includes a corresponding condenser fan (not shown), and the evaporator 38 also includes a corresponding air moving device 42, such as a motor driven fan or blower. The air moving device 42 is provided as needed for circulating air from each of the compartments 26, 30 over the evaporator 38 to maintain a fairly consistent temperature throughout each of the compartments 26, 30. The circulating air may, in the alternative, be provided by natural convection in some installed configurations. A temperature sensor is provided for each of the compartments 26, 30 to provide appropriate signal inputs to a controller for the appliance as is known.

Figure 3:
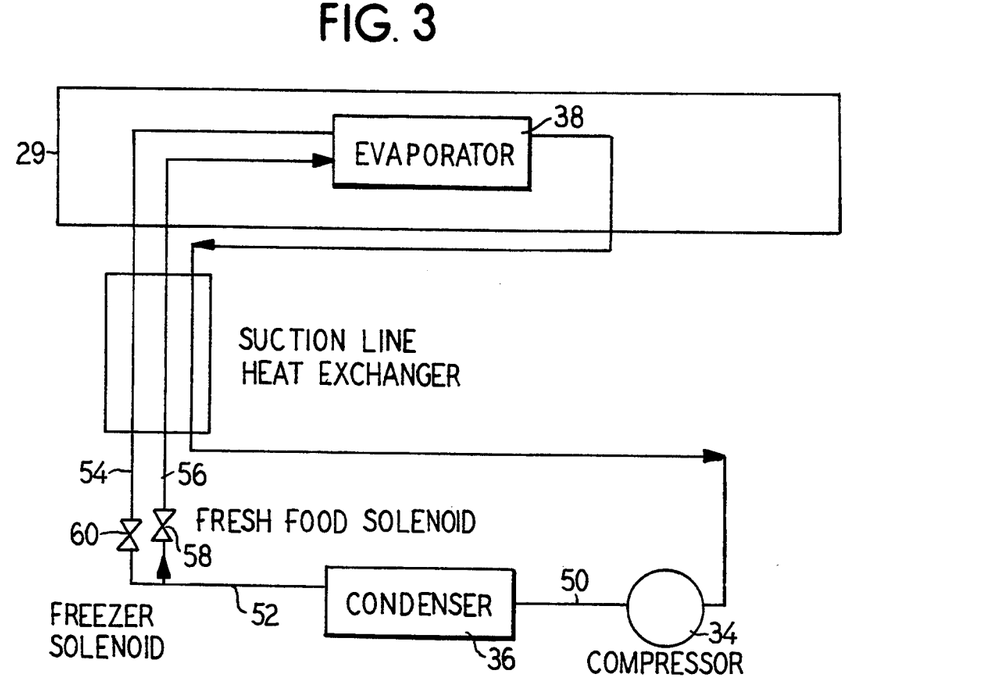
FIG. 3 is an embodiment of a refrigeration circuit diagram for the fresh food cycle.

As shown in FIG. 3, a refrigeration circuit is illustrated. In this embodiment, the single compressor 34 supplies refrigerant through line 50 to the single condenser 36. Refrigerant then flows out of the condenser 36 on line 52 and is presented to parallel capillary lines 54, 56. Line 54 is a low pressure (freezer compartment) capillary, and line 56 is a high pressure (fresh food compartment) capillary. On/off latching valves 58, 60 are used to regulate the refrigerant flow to the capillaries on the lines 54, 56. Alternatively, a three-position selected valve can also be utilized at the junction of lines 52, 56 and 54 to allow refrigerant flow either through lines 56 or line 54, but not both. The third position of such a valve would be to close both lines 54 and 56. The solenoid valves 58, 60 should be preferably be a latching type which requires power for a brief moment (typically a fraction of a second) to change position from one capillary to the other or to the completely closed position. If latching type valves are not used, then the valve 58 should be a normally closed type valve, and the valve 60 should preferably also be a normally closed type valve, but a normally open valve can also be used. As illustrated in FIG. 3, the valve 58 is open resulting in refrigerant flow to the fresh food compartment.

Referring again to FIGS. 2 and 2a, the dual temperature evaporator 38 is shown located in the mullion (separator) section 29 of the refrigeration appliance 20. The evaporator 38 of the present invention, however, is not limited to that location only. Air dampers 31, 33 are provided to direct the air flow from either the freezer compartment 26 or the fresh food compartment 30 over the evaporator 38 in a sequential manner as will be further described. The evaporator 38 is housed in the mullion section 29 which may be insulated thermally from the compartments 26 and 30 with insulated panels which may contain vacuum panels 39 to allow for compactness.

The mullion section 29 may also be provided with cover plates (not shown). Air flow from either of the compartments 26 or 30 through the evaporator 38 is channeled through a freezer compartment air inlet and an air outlet or, alternatively, a fresh food compartment air inlet and an air outlet. The details of the components are illustrated in commonly assigned, copending U.S. Pat. No. 5,231,847, Attorney Docket No. PA-5848-0-RE-USA, which is fully incorporated herein by reference.

Figure 4:
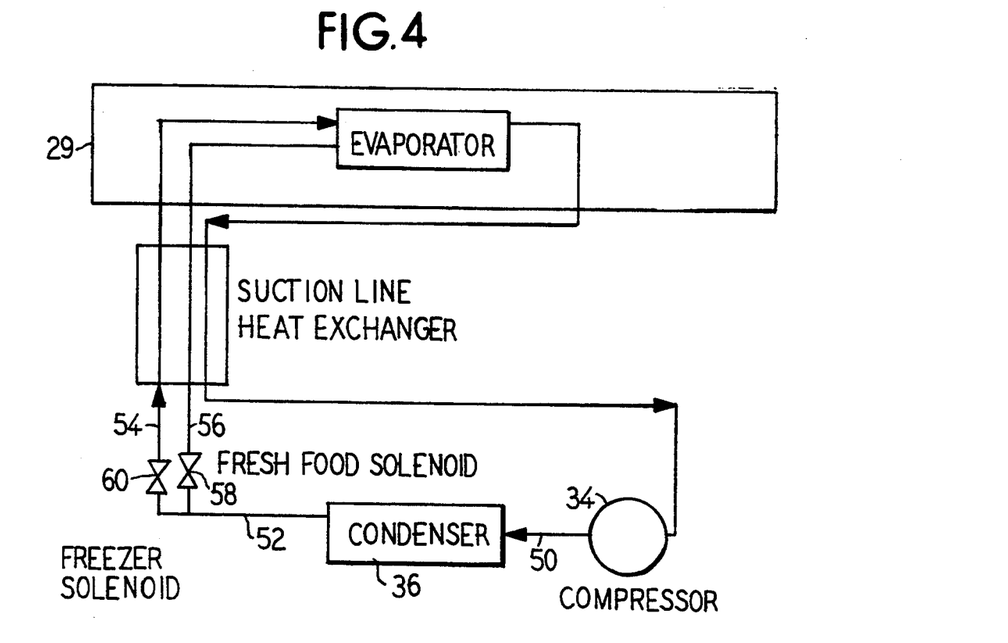
FIG. 4 is a second embodiment of a refrigeration circuit diagram for the frozen food cycle.

As previously described with respect to FIG. 3, the dual temperature evaporator system was described for the fresh food cycle. Referring now to FIG. 4 which illustrates the system of FIG. 3 but for the freezer cycle, the two capillary tubes 54 and 56 along with their respective two latching type solenoid valves 58 and 60 are used to control the refrigerant flow from the compressor 34 through the line 50 to the condenser 36. Refrigerant flows out of the condenser 36 on line 52 and is presented to the parallel capillary lines 54 and 56. The mullion section 29 including the evaporator 38 receives refrigerant for the freezer cycle through the line 54 when the latching type solenoid valve 60 is open.

Control of the solenoid valves 58 and 60 will be hereinafter described with reference to FIGS. 5-12. The flowcharts shown in FIGS. 5-12 illustrate the various control functions and procedures for operation of the refrigeration appliance.

Referring now to FIGS. 5-8, when the refrigeration appliance is first started, both of the compartments 26, 30 will demand cooling. FIGS. 5-8 will be described for one compartment acting as a fresh food compartment with the other compartment being a frozen compartment. It should be understood, however, that the compartments may be reversed and may also be convertible. That is, both compartments can be freezer compartments or both can be fresh food compartments which will be further described with reference to FIGS. 9-12. The following abbreviations are used in the flowcharts of FIGS. 5-12:

ABBREVIATIONS USED IN FLOW CHARTS

FF: Fresh Food (Cooling)
FZ: Freezer (Cooling)
FFSV: Fresh Food Solenoid Valve
FZSV: Freezer Solenoid Valve
FFHST: Fresh Food High Set Temperature
FFLST: Fresh Food Low Set Temperature
FZHST: Freezer High Set Temperature
FZLST: Freezer Low Set Temperature
CCTT: Convertible Compartment Threshold Temperature
QPTT: Quick Pulldown Threshold Temperature
EQT: Equalization Time
FFRT: Fresh Food Run Time
FZRT: Freezer Run Time
FFDT: Fresh Food Demand Time
FZDT: Freezer Demand Time
TBD: Time Before Defrost When the refrigerator appliance 20 is first powered up, a quick pulldown threshold temperature is used to control the solenoid valves for the initial pulldown to control the solenoid valves for the initial pulldown of the appliance 20 from the ambient conditions. The control sequence to be described below starts with the powering up the refrigerator 20 for the first time. The fresh food compartment of the freezer compartment/fresh food compartment combination is given priority over the freezer compartment. Referring now to FIGS. 5-8, control begins as shown at 70 by initializing the cooling of the fresh food compartment. Air dampers 31, 33 are first initialized as shown at 72 to the position of fresh food cooling mode by energizing the latching solenoids controlling the air dampers 80, 81 with a short pulse resulting in opening of air dampers 80, 81 to the fresh food compartment 30. A quick pull-down threshold temperature is detected and is then used to control the latching solenoid valves 58, 60.

Figure 5:
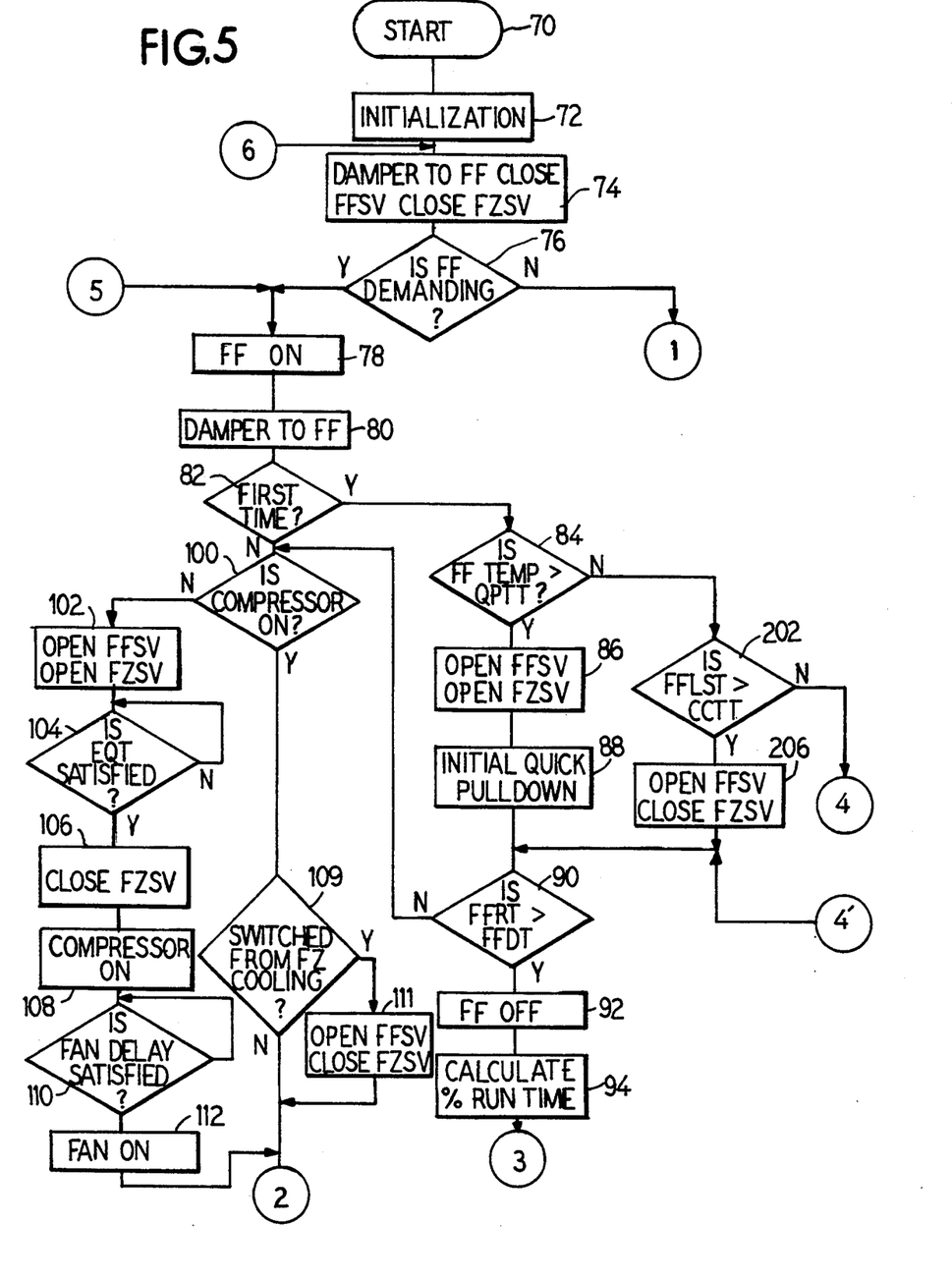
FIG. 5 is a flowchart illustrating the control sequence for the fresh food cycle of the dual temperature evaporator of the refrigeration appliance.

When the fresh food compartment temperature is above the quick pull-down threshold temperature as shown at 84, both the freezer and the fresh food latching solenoid valves 58, 60 are energized as shown at 86 with a short pulse to their open positions to utilize the high refrigerant flow for quick cooling. The compressor 34, the fan of the condenser 36 and the fan 42 of the evaporator 38 are turned on for an initial quick pull-down as shown at 88.

When the run time for the fresh food cooling exceeds a preset fresh food demand time (typical run time) as determined at 90, the latching solenoids (not shown) for the air dampers 31, 33 are energized with a reverse polarity to switch them to the position of freezer cooling to cool the freezer compartment as shown at 132 after a deactivating cooling to the fresh food compartment as shown at 92. The percent run time of the fresh food compartment as shown at 94 may be calculated following deactivation of the fresh food compartment. Similar calculations may be made for the frozen compartment as shown in FIGS. 5-12 as well as "ON" times of the fresh food and frozen compartments. The freezer cooling continues until the run time exceeds a set freezer demand time as determined at 91. Then, the cooling is switched back to the fresh food cooling again as shown at 78 of FIG. 5 after terminating cooling of frozen compartment as shown at 93 in FIG. 6. The cooling is switched back and forth between both compartments based on the set demand times (typical cycle times) for the compartments 26, 30.

Figure 6:
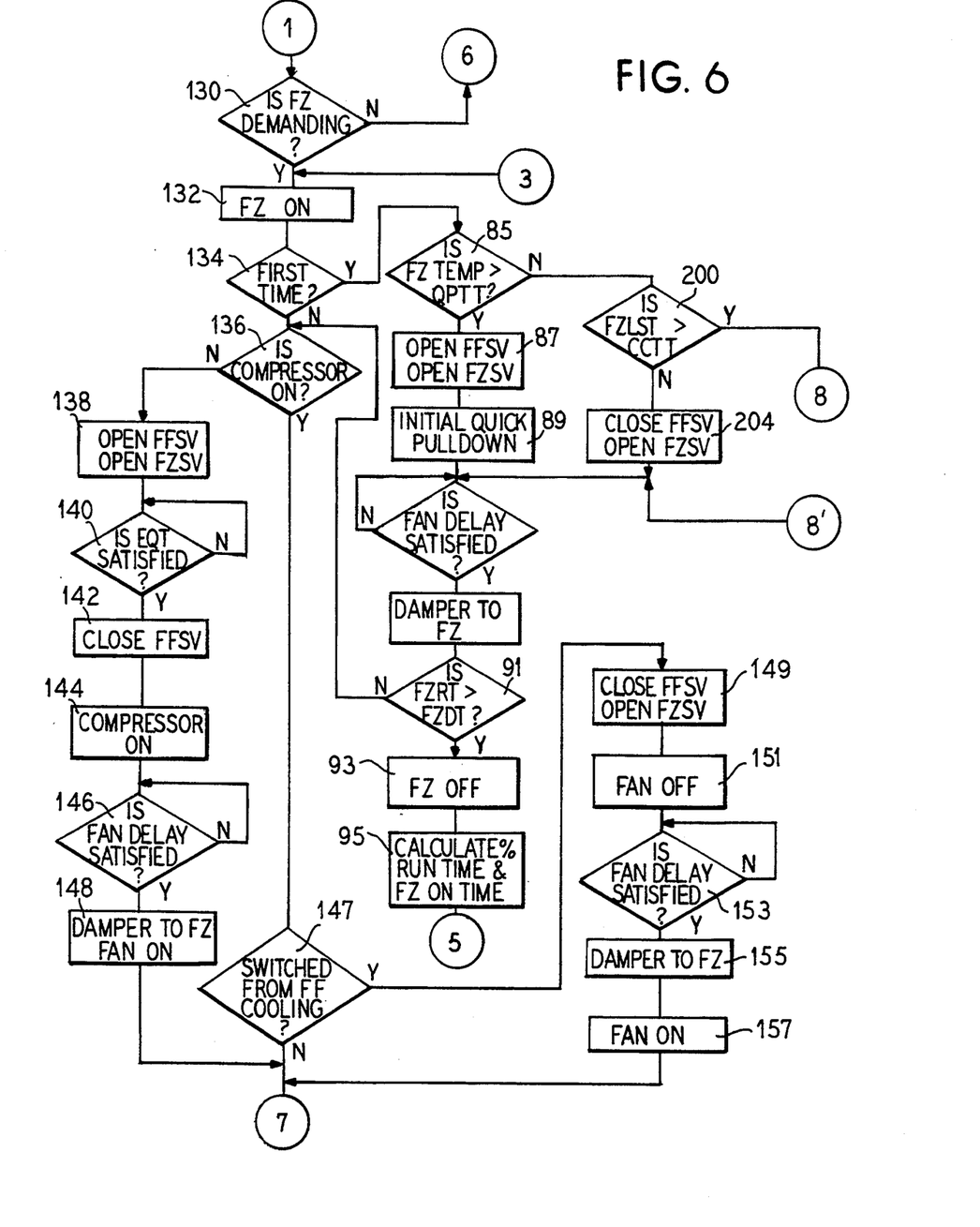
FIG. 6 is a flowchart illustrating the control sequence for the frozen food cycle of the dual temperature evaporator of the refrigeration appliance.

When the fresh food compartment temperature reaches below the quick pull-down threshold temperature as determined at 84, the freezer solenoid valve 60 is closed and only the fresh food solenoid valve 58 is kept open to cool the fresh food compartment to its low set temperature as shown at 206. Likewise, when the freezer compartment temperature reaches below the quick pull-down threshold temperature as determined at 85, the fresh food solenoid valve 58 is closed and only the freezer solenoid valve 60 is kept open to cool the freezer compartment to its low set temperature as shown at 200 and 204. The cooling of both compartments continues based on the set demand times.

When the cooling of one compartment is satisfied, the cooling of the other compartment continues until the demand for that compartment is satisfied as determined at 109 and 147 of FIGS. 5 and 6, respectively. The run time of the cooling is, therefore, not controlled by the set demand time.

When the demands for both compartments are satisfied, the refrigeration appliance goes to an "OFF" cycle. The compressor 34 and the fan of the condenser 36 are turned off, and both of the solenoid valves 58, 60 are closed. The fan 42 of the evaporator 38 may be turned off with a time delay set in an end-of-cycle fresh food fan time or end-of-cycle freezer fan time depending on the cycle which has just ended. As a result, air continues circulating through the evaporator 38 to further cool down the particular compartment 26 or 30. After the fan 42 of the evaporator 38 is turned off, the air dampers are positioned in the fresh food cooling position during the off-cycle.

Following the "OFF" cycle (compressor off), when the temperature in the fresh food compartment exceeds the set fresh food high set temperature, the fresh food compartment demands cooling. In the alternative, if the temperatures in both compartments 26, 30 exceed the set high set temperatures at the same time and, therefore, both compartments 26, 30 demand cooling simultaneously, the cooling priority is given to the fresh food cooling.

As a result, the control initiates the fresh food cooling by first verifying that the compressor is on as determined at 100 in FIG. 5. Both the freezer and fresh food solenoid valves 58, 60 are opened as shown at 102 first for a period of time set in the equalization time as shown at 104 to allow the high side and the low side pressures to equalize. The air dampers 31, 33 are previously placed in the position of fresh food cooling as shown at 80. Then, the freezer solenoid valve 60 is closed, and the fresh food solenoid valve 58 is kept open as shown at 106. The compressor 34 and the fan of the condenser 36 are turned on as shown at 108, and the fan 42 of the evaporator 38 may be turned on with the time delay set in the beginning of cycle fresh food fan delay as shown at 110 and 112.

Figure 7:
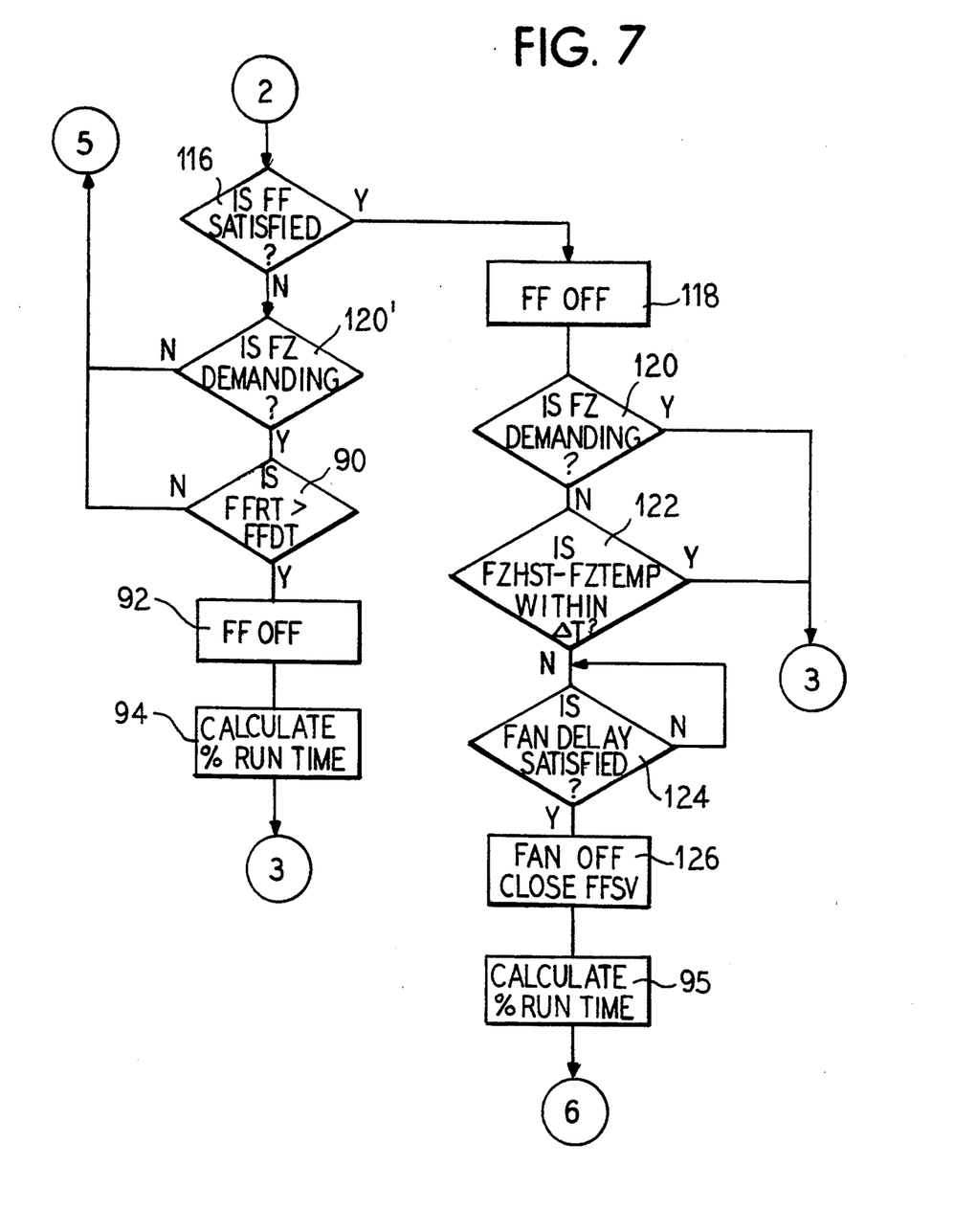
FIG. 7 is a flowchart illustrating the conversion between the fresh food cycle and the frozen food cycle.

Referring to FIG. 7, when the fresh food compartment temperature reaches below the set fresh food low set temperature, the demand for cooling is satisfied as shown at 116 and cooling thereto may be terminated as shown at 118. Then, the freezer compartment demand for cooling is checked as shown at 120. At that time, if the detected freezer compartment temperature is approaching the set freezer high set temperature as shown at 122, the freezer compartment will begin demanding cooling of the freezer compartment within a short period of time.

Generally, as is well-known, start-up of the compressor 34 is the most inefficient portion of the refrigeration cycle. The procedure of the present invention reduces energy consumption by prematurely initiating the freezer cooling cycle by selecting an appropriate value of a change in freezer compartment temperature ($\Delta T_2$) resulting in initiation rather than deactivating of the compressor 34 and then restarting the compressor 34 at a relatively short period of time thereafter.

When the fresh food cooling has been satisfied, the control determines the freezer compartment temperature. If the temperature reaches a point above the set freezer high set temperature as determined at 120 and is, therefore, demanding cooling, or if the temperature reaches a point where the change in temperature between the set freezer high temperature and the compartment temperature is less than $\Delta T_2$ as determined at 122, the control passes to the freezer cooling cycle without turning off of the compressor 34 and the fan of the condenser 36 in either case.

If neither of the conditions have been satisfied (the freezer high set temperature has not been exceeded or the change in temperature is greater than $\Delta T_2$), the compressor 34 and the fan of the condenser 36 are turned off as shown at 124 and 126. The fresh food solenoid valve 58 is closed and no pump out of refrigerant results. The fan 42 of the evaporator 38 may be subsequently turned off with a time delay set in the end of cycle fresh food fan time. The air dampers 31, 33 are left in the position of fresh food cooling.

The switching from freezer compartment cooling to fresh food compartment cooling, after the demand for the freezer cooling is satisfied, is accomplished by the air dampers 31, 33 being switched to the position of fresh food compartment cooling. Accumulated freezer run time is updated, then the fresh food solenoid valve 58 is opened, and the freezer solenoid valve 60 is closed as shown at 111. The compressor 34, the fan of the condenser 36 and the fan 42 of the evaporator 38 are not turned off. The cooling continues until the fresh food compartment temperature reaches below the set fresh food low set temperature. After the demand for cooling is satisfied, the compressor 34 and the fan of the condenser 36 are turned off. The fresh food solenoid valve 58 is closed, and no pump out of refrigerant is required. The fan 42 of the evaporator 38 may then be turned off with a time delay set in the end of cycle fresh food fan time, and the air dampers are left in the position of fresh food cooling.

The freezer cooling cycle is primarily illustrated with reference to FIG. 6. From the off cycle (compressor off), when the temperature in the freezer compartment reaches above the set freezer high set temperature, the freezer compartment demands cooling as shown at 130. The control initiates the freezer cooling as shown at 132, and both the freezer and fresh food solenoid valves 58, 60 are open as shown at 138 for a period of time set in the equalization time as determined at 140 to allow the high side and the low side pressures to equalize.

After the pressures are equalized, the fresh food compartment solenoid valve 58 is closed, but the freezer solenoid valve 60 is kept open as shown at 142. The compressor 34 and the fan of the condenser 36 are subsequently turned on as shown at 144. The fan 42 of the evaporator 38 may be turned on following a time delay set in the beginning of cycle freezer fan delay as determined at 146 and 148. This allows the evaporator 38 to cool prior to its fan 42 being turned on. In addition, before the fan 42 is turned on, the air dampers 31, 33 are switched to the position of freezer cooling.

Figure 8:
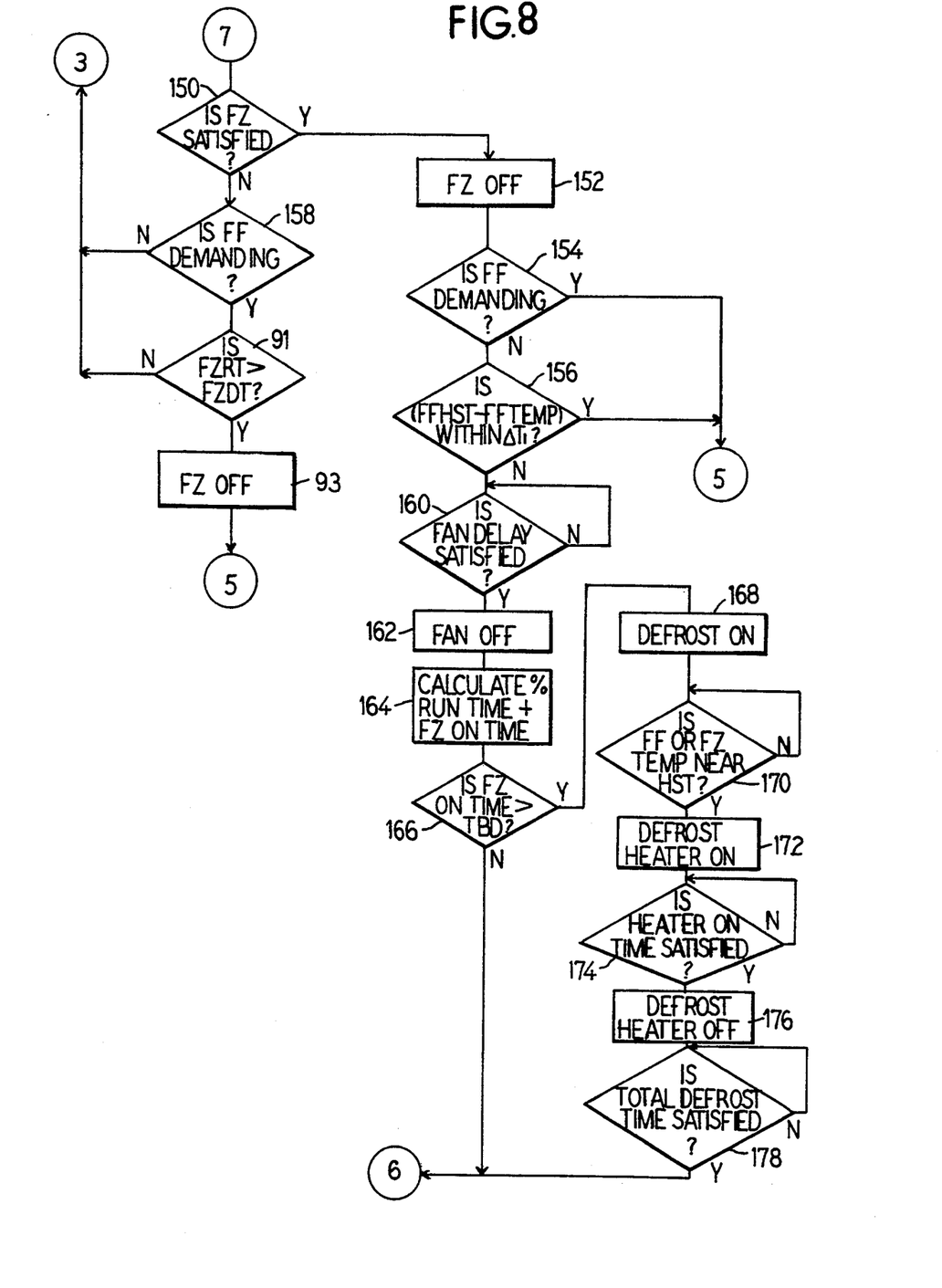
FIG. 8 is a flowchart illustrating the steps for defrosting following satisfaction of the fresh food and/or frozen food cycles.

Referring to FIG. 8, when the freezer compartment temperature reaches below the set freezer low set temperature as shown at 150, the demand for cooling is satisfied and the cooling to the freezer compartment may be shut-off at 152. At that time, if the fresh food compartment temperature is approaching the set fresh food high temperature, the fresh food compartment will initiate its demand for cooling within a short period of time as shown at 154 and 156. The fresh food cooling cycle can, therefore, be initiated prematurely by selecting an appropriate value of the change in temperature ($\Delta T_1$) required for initiation.

If the freezer compartment cooling is satisfied, the control determines if the fresh food compartment has reached a point above the set fresh food high set temperature and subsequently will demand cooling at 158, or if the fresh food compartment has reached a temperature where the change in temperature between the set fresh food high set temperature and the compartment temperature is less than $\Delta T_1$ at 154. If either condition is satisfied, the control passes to the fresh food cooling cycle without turning off of the compressor 34 and the fan of the condenser 38. The accumulated freezer run time is then updated as shown at 164.

If neither of the conditions are satisfied, however, the compressor 34 and the fan of the condenser 36 are turned off, but the accumulated freezer run time is still updated. The freezer solenoid valve 60 is then closed, and no pump out of refrigerant is required. The fan 42 of the evaporator 38 may be turned off with the time delay set in the end of cycle freezer fan time. After the fan 42 of the evaporator 38 is turned off, the air dampers 31, 33 are placed in the position of fresh food cooling.

Referring to FIG. 6, to switch from the fresh food compartment cooling cycle to the freezer compartment cooling cycle, after the demand for the fresh food compartment cooling is satisfied as determined at 147, the freezer solenoid valve 60 is opened and the fresh food solenoid valve 58 is closed as shown at 149. The compressor 34 and the fan of the condenser 36 are not turned off, but the fan 42 of the evaporator 38 may be turned off for a period set in the fan delay from fresh food to freezer conversion then turned back on again as shown at 151 and 153. Just before the fan of the evaporator 38 is turned on as shown at 157, the air dampers 31, 33 are switched to the position of freezer compartment cooling as shown at 155.

The cooling continues until the freezer compartment temperature reaches below the set freezer low set temperature.

After the demand for cooling is satisfied, the compressor 34 and the fan of the condenser 36 are turned off. The accumulated freezer run time is updated, and the freezer solenoid valve 60 is closed. Again, no pump out of refrigerant is required. The fan of the evaporator 38 may then subsequently be turned off after a time delay set in the end of cycle freezer fan time. After the fan 42 of the evaporator 38 is turned off, the air dampers 31, 33 are placed in the position required for fresh food cooling.

A defrost cycle may also be implemented for the refrigeration system in accordance with the procedures set forth by the flowchart illustrated in FIG. 8. When the fresh food compartment cooling cycle has been completed and the freezer compartment is not calling for cooling and also the accumulated freezer run time has exceeded the time set in the time before defrost as determined at 166, the refrigeration device goes into the defrost cycle as shown at 168, and the cooling function is disabled.

When either compartment temperature reaches the high set temperature as determined at 170, a defrost heater is turned on as shown at 172. The heater on time is then set in the defrost heater on time. After the heater is turned off and the time which has elapsed since the heater is turned on satisfies the set total defrost cycle time, various timers are reset, and the defrost cycle ends as determined and shown at 174, 176 and 178. Then, the cooling functions may resume. Of course, the percentage time of fresh food compartment cooling and frozen compartment cooling may be calculated following their respective cooling cycles as shown in FIGS. 5-8.

FIGS. 9-12 illustrate changes in the flowcharts of FIGS. 5-8 required for operating the compartments 26, 30 as convertible compartments. A convertible compartment threshold temperature (CCTT) parameter is used to operate the two compartments 26, 30 of the refrigeration appliance in four different modes.

A first mode is provided when the freezer low set temperature is set below the convertible compartment threshold temperature as shown in FIG. 6 at 200, and the fresh food low set temperature is set above the convertible compartment threshold temperature as shown at 202 in FIG. 5. The former compartment is operated as a freezer compartment by opening the freezer solenoid valve 60 during cooling as shown at 204, and the latter compartment is a fresh food compartment by opening the fresh food solenoid valve 58 during cooling as shown at 206.

Figure 10:
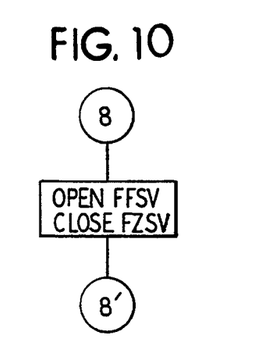

A second mode is implemented when both the freezer low set temperature and the fresh food low set temperature are set above the convertible compartment threshold temperature. Both compartments 26, 30 are then operated as fresh food compartments by opening the fresh food solenoid valve 58 during cooling of either compartment as shown in FIG. 10.

Figure 9:
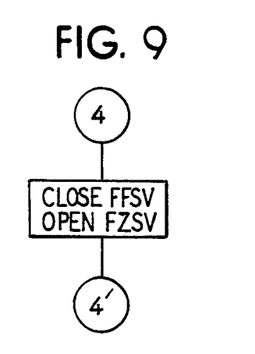
FIGS. 9–12 are diagrams illustrating changes required to the flowcharts of FIGS. 5–8 for a refrigeration appliance having convertible compartments.

A third mode is implemented when both the freezer low set temperature and the fresh food low set temperature are set below the convertible compartment threshold temperature. As a result, both compartments 26, 30 may be operated as freezer compartments by opening of the freezer solenoid valve 60 during cooling of either compartment as shown in FIG. 9.

Finally, when the freezer low set temperature is set above the convertible compartment threshold temperature and the fresh food low set temperature is set below the convertible compartment threshold temperature, the former compartment is operated as a fresh food compartment by opening the fresh food solenoid valve 58 during cooling, and the latter compartment is operated as a freezer compartment by opening the freezer solenoid valve 60 during cooling. The four modes of operation of the convertible compartments are illustrated in copending U.S. Pat. No. 5,231,847, Attorney Docket No. PA-5848-0-RE-USA, which is fully incorporated herein by reference.

Figures 11, 12:
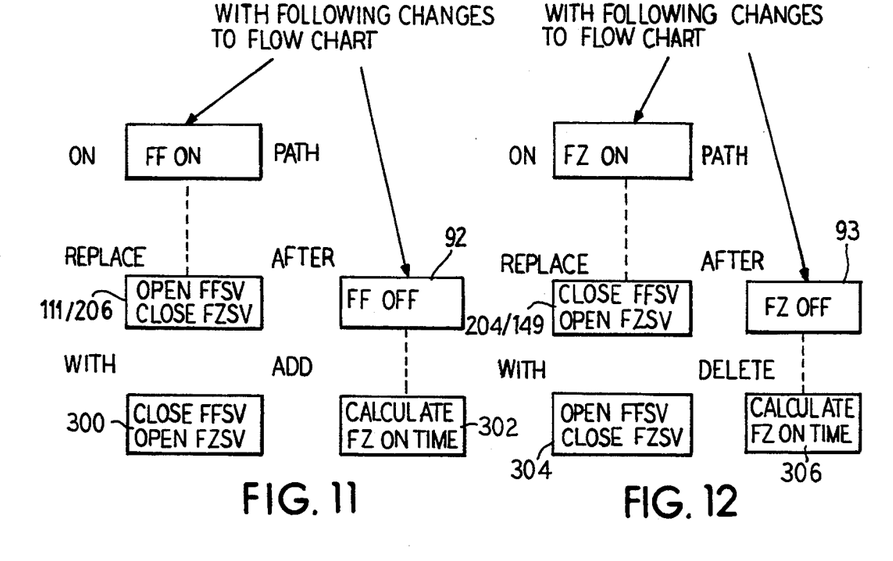

As shown in FIG. 11, after the fresh food compartment is turned on for cooling, the fresh food solenoid valve 58 is closed and the frozen food solenoid valve 60 is opened rather than in the reverse as previously described as shown at 300. In addition, after the fresh food compartment cooling is turned off, a calculation of freezer on time is performed as shown at 302.

With respect to FIG. 12, following cooling turned on to the freezer compartment, the fresh food solenoid valve 58 is opened, and the freezer solenoid valve 60 is closed rather than in the reverse as shown at 304. In addition, after the cooling to the freezer compartment is turned off, the percentage run time is calculated rather than the freezer on time as shown at 306.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defines as follows:

1. A method of operating a refrigeration appliance having at least two separate compartments to be cooled and a refrigeration device having a single compressor, a single condenser, and a single evaporator located in a plenum which is in communication with each of said compartments by means of an air damper system, comprising the steps of:

(a) detecting whether either of said compartments is demanding cooling;

(b) upon detection of a cooling demand by a first compartment, operating said refrigeration device with said air damper system set to direct air flow from said evaporator to said first compartment until the detected demand for cooling has been satisfied;

(c) determining if a second compartment is demanding cooling during cooling of said first compartment;

(d) if no demand of said second compartment for cooling is made prior to satisfaction of the demand by said first compartment, then returning to step (a);

(e) upon demand of said second compartment for cooling prior to satisfaction of the demand by said first compartment, continuing the cooling of said first compartment until obtaining the first to occur of satisfying said demand for cooling by said first compartment or passage of a first preset time period;

(f) upon obtaining said first to occur, switching air flow from said evaporator to said second compartment by using said air damper system and initiating cooling of said second compartment until the detected demand for cooling of said second compartment has been satisfied;

(g) detecting whether said first compartment is demanding cooling during cooling of said second compartment;

(h) if no demand of said first compartment for cooling is made prior to satisfaction of the demand by said second compartment, then returning to step (a);

(i) upon demand by said first compartment for cooling prior to satisfaction of the demand by said second compartment, continuing the cooling of said second compartment until obtaining the first to occur of satisfying said demand for cooling by said second compartment or passage of a second preset time period;

(j) upon obtaining said first to occur, switching air flow from said evaporator to said first compartment by using said air damper system and initiating cooling of said first compartment until the detected demand for cooling of said first compartment has been satisfied, then returning to step (a).

2. The method according to claim 1 including, prior to switching cooling from one of said compartments to the other, the steps of detecting a temperature in the other of said compartments, comparing it to a demand temperature at which said other compartment will begin demanding cooling, and if said detected temperature is within a predetermined range to said demand temperature, prematurely initiating cooling of said other compartment immediately upon termination of cooling of said compartment.

3. The method according to claim 2 further comprising the step of terminating operation of the condenser fan and the compressor if neither of the compartments is demanding cooling or within a predetermined range of said demand temperature.

4. The method according to claim 1 further comprising the step of terminating operation of the evaporator fan a predetermined time period following neither of the compartments demanding cooling or being within a predetermined range of said demanding temperature.

5. The method according to claim 1 further comprising the step of assigning a priority for cooling to one of the compartments.

6. The method according to claim 1 further comprising the step of equalizing pressures in said evaporator prior to initiating of cooling.

7. The method according to claim 1 further comprising the step of determining run times for cooling of the first compartment and the second compartment.

8. The method according to claim 1 including the step of periodically raising the temperature of said evaporator to effect an automatic defrosting of water vapor condensed and frozen on said evaporator.

9. The method according to claim 8, wherein said step of periodically raising the temperature of said evaporator occurs the first time after a predetermined period of time has elapsed since a previous defrost cycle and when one of said compartments next demands cooling.

10. The method according to claim 8, wherein said step of periodically raising the temperature of said evaporator is accomplished by circulating air from one of said compartments maintained above the freezing temperature over said evaporator.

11. The method according to claim 1, wherein said step of operating said refrigeration device includes selectively opening and closing valves in a refrigeration circuit with multiple refrigerant flow control devices which are in turn selected based on the temperature to be achieved in said compartments.

12. The method according to claim 1 and further including the step of operating said evaporator at a lower pressure during the cooling of one of said compartments than during the cooling of the other of said compartments to produce a cooler temperature in said one of said compartments than said other of said compartments.

13. The method according to claim 1, wherein said first preset time period comprises a preset normal run time for said first compartment.

14. The method according to claim 1, wherein said second preset time period comprises a preset normal run time for said second compartment.

15. The method according to claim 1, wherein said step of operating said refrigeration device includes selectively energizing solenoids to change the position of said air damper system.

16. A refrigeration appliance having at least a first compartment and a second separate compartment to be cooled and a refrigeration device with an evaporator comprising:

means for detecting whether either of said compartments is demanding cooling;

means for operating the refrigeration device until cooling has been satisfied for said first compartment upon detection of a cooling demand by said first compartment;

means for detecting whether said second compartment is demanding cooling during cooling of said first compartment;

means for continuing the cooling of said first compartment until obtaining a first to occur of satisfying said demand for cooling by said first compartment or passage of a first preset time period, upon detecting demand by said second compartment for cooling prior to satisfaction of the demand by said first compartment;

means for terminating cooling of said first compartment and initiating cooling of said second compartment until the detected demand for cooling of said second compartment has been satisfied, upon obtaining said first to occur;

means for detecting whether said first compartment is demanding cooling during cooling of said second compartment;

means for continuing the cooling of said second compartment until obtaining a first to occur of satisfying said demand for cooling by said compartment or passage of a second preset time period, upon demand by said first compartment; and means for terminating cooling of said second compartment and initiating cooling of said first compartment until the detected demand for cooling of said first compartment has been satisfied, upon obtaining said first to occur.

17. The refrigeration appliance according to claim 16, wherein said means for detecting whether said second compartment is demanding cooling during cooling of said first compartment further comprises means for detecting whether said second compartment is within a predetermined range of said second compartment demand temperature and said means for detecting whether said first compartment is demanding cooling during cooling of said second compartment includes means for detecting whether said first compartment is within a predetermined range of the cooling demand temperature for said first compartment.

18. The refrigeration appliance according to claim 16, wherein said refrigeration device comprises a compressor and a condenser with a condenser fan and further comprising means for terminating operation of the condenser fan and the compressor following satisfaction of cooling demand to both compartments.

19. The refrigeration appliance according to claim 16, wherein said refrigeration device comprises an evaporator fan and further comprising means for terminating operation of an evaporator fan a predetermined time period following satisfaction of cooling demand to both compartments.

20. The refrigeration appliance according to claim 16 further comprising means for periodically raising the temperature of said evaporator to effect a defrosting of water vapor condensed and frozen on said evaporator after a predetermined time period has elapsed since a previous defrosting of said evaporator and when one of said compartments next demands cooling.

21. The refrigerator appliance according to claim 16, wherein said refrigeration device includes flow restriction devices for controlling a fluid refrigerant flow and valves positioned at inlets of said flow restriction devices which may be selectively opened and closed to initiate and terminate cooling for said compartments.

22. The refrigeration appliance according to claim 16 further comprising means for selectively switching air flow from said evaporator to a selected one of said compartments.

23. The refrigeration appliance according to claim 16, wherein the first compartment and the second compartment are a fresh food compartment and a freezer compartment respectively.

24. A method of operating a refrigeration appliance having at least two separate compartments to be cooled and a refrigeration device having a compressor, a condenser and an evaporator with an evaporator fan in a plenum which is in communication alternately with each of the compartments by means of an air damper system, comprising the steps of:
  (a) upon detection of a cooling command by a first compartment cooling said first compartment by said evaporator until the detected demand for cooling has been satisfied, or if a demand by said second compartment is detected prior to satisfying the demand of said first compartment, continuing the cooling of said first compartment until obtaining a first to occur of satisfying said demand for cooling by said first compartment or passage of a first preset time period;
  (b) upon obtaining said first to occur, terminating cooling of said first compartment and initiating cooling of said second compartment by said evaporator until the detected demand for cooling of said second compartment has been satisfied, or if a demand by said first compartment is detected prior to satisfying the demand of said second compartment, continuing the cooling of said second compartment until obtaining a subsequent first to occur of satisfying said demand for cooling by said second compartment or passage of a second preset time period;
  (c) upon obtaining second subsequent first to occur, terminating cooling of said second compartment and returning to step (a).

25. The method according to claim 24 further comprising step of initiating cooling of said second compartment after demand for cooling has been satisfied for said first compartment if either the second compartment is demanding cooling or the second compartment is within a predetermined range of a cooling demand temperature for said second compartment.

26. The method according to claim 24 further comprising the step of initiating cooling of first compartment after demand for cooling has been satisfied for the second compartment if either the first compartment is demanding cooling or the first compartment is within a predetermined range of a cooling demand temperature for said first compartment.

27. The method according to claim 24 further comprising the step of calculating run times for cooling of the compartments.

28. The method according to claim 24 further comprising the step of periodically raising the temperature of said evaporator to effect a defrosting of the refrigeration device after a predetermined time period has elapsed since a previous defrosting of the refrigeration device and when one of said compartment next demands cooling.

29. The method according to claim 24 wherein the first compartment and the second compartment may be a fresh food compartment and/or a freezer compartment.

30. The method according to claim 24 further comprising the step of operating said evaporator fan for a predetermined time period after cooling of either of said compartments has terminated.

* * * * *